United States Patent
Okuda et al.

(10) Patent No.: US 6,228,305 B1
(45) Date of Patent: May 8, 2001

(54) METHOD FOR THE PRODUCTION OF AN OPENING-CLOSING MEMBER AND A SUNROOF PRODUCED THEREFROM FOR USE WITH VEHICLE

(75) Inventors: Shinji Okuda, Hyogo-ken; Makoto Shiokawa, Saitama-ken, both of (JP)

(73) Assignees: Sunstar Giken Kabushiki Kaisha, Osaka; Honda Giken Kogyo K.K., Tokyo, both of (JP)

( * ) Notice: Subject to any disclaimer, the term of this patent is extended or adjusted under 35 U.S.C. 154(b) by 0 days.

(21) Appl. No.: 09/305,114

(22) Filed: May 4, 1999

(30) Foreign Application Priority Data

May 7, 1998 (JP) .................................................. 10-124463

(51) Int. Cl.$^7$ .................................................... B29C 47/00

(52) U.S. Cl. ........................... 264/252; 156/108; 156/245; 264/279.1

(58) Field of Search ................................... 156/108, 245, 156/242, 78; 264/252, 277, 279.1, 299, 319, 320, 321, 46.4, 271.1, 279; 296/216.01, 216.09

(56) References Cited

U.S. PATENT DOCUMENTS

| | | | |
|---|---|---|---|
| 4,999,147 | * | 3/1991 | Kojima et al. ........................ 264/252 |
| 5,061,429 | * | 10/1991 | Yoshihara et al. .................... 264/252 |
| 5,170,587 | * | 12/1992 | Nakatani et al. ...................... 296/216 |

FOREIGN PATENT DOCUMENTS

| | | | |
|---|---|---|---|
| 01171911 | * | 7/1989 | (JP) . |
| 088001711 | * | 1/1996 | (JP) . |

\* cited by examiner

*Primary Examiner*—Jeff H. Aftergut
*Assistant Examiner*—John T. Haran
(74) *Attorney, Agent, or Firm*—Wenderoth, Lind & Ponack, L.L.P.

(57) ABSTRACT

A method for the production of a sunroof includes a step for applying adhesive into an edge section and a molding groove along the edge section of glass disposed accurately on a lower mold. A foaming material is applied in the molding groove at a peripheral portion of the glass outside the applied adhesive. The adhesive and the foaming material applied on the glass are molded by connecting the lower mold to an upper mold with a frame, and then heated a step of heating in a state in which the molds are pressed in a vertical direction. The lower and upper molds are detached, and a sunroof is discharged as a finished product.

30 Claims, 12 Drawing Sheets

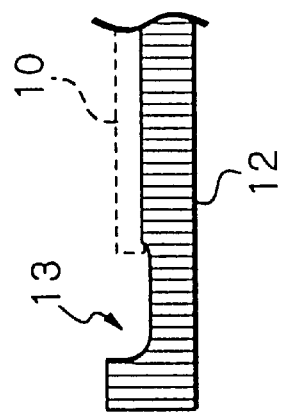
Fig. 4(c) SECTION A-A'
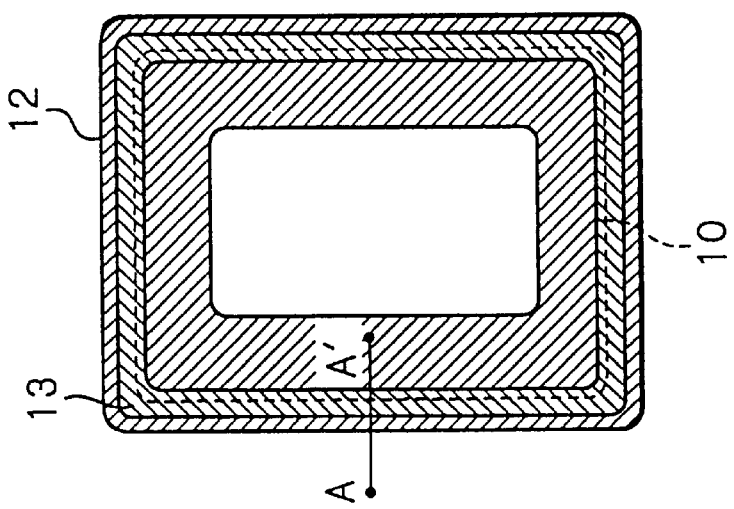
Fig. 4(b) LOWER MOLD
MOLDING POSITION OF GLASS
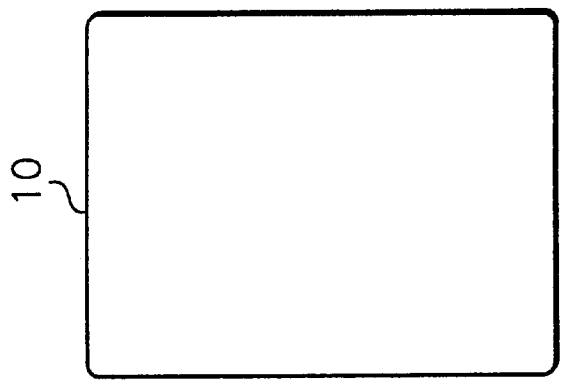
Fig. 4(a) GLASS

SECTION B-B'

STATE OF COUPLING WITH LOWER MOLD

UPPER MOLD

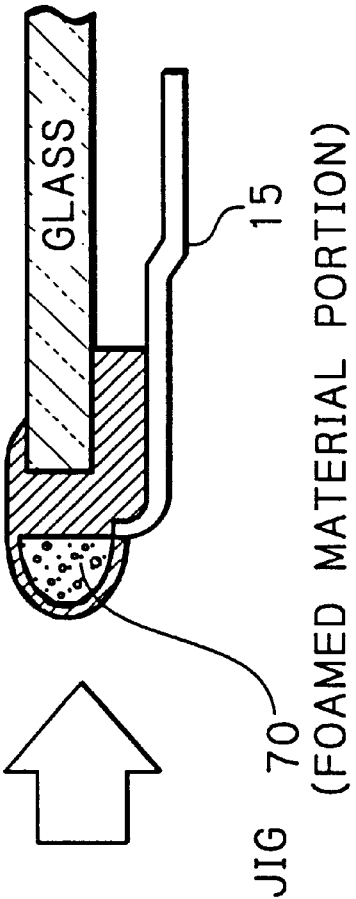
Fig. 10(a) PRIOR ART
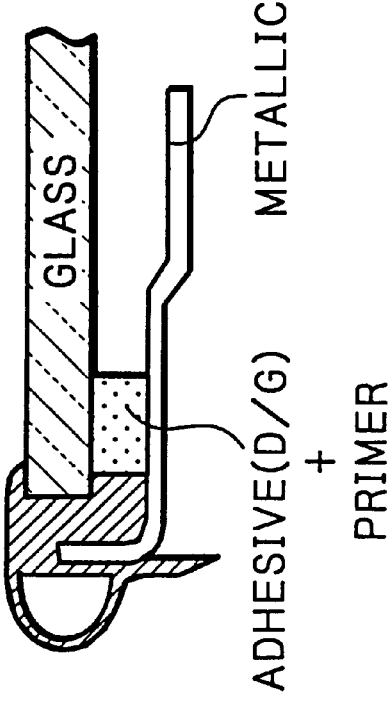
Fig. 10(b) PRESENT INVENTION

Fig. 13
(1) 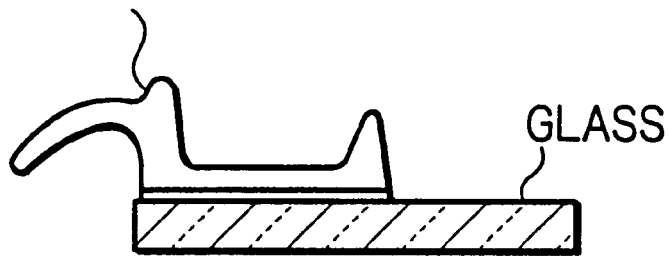
(2) 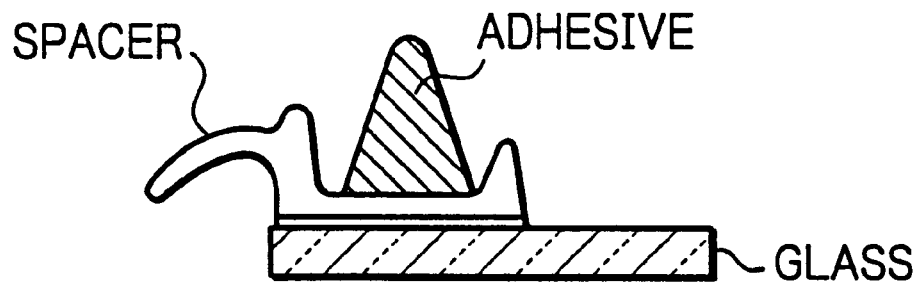
(3) 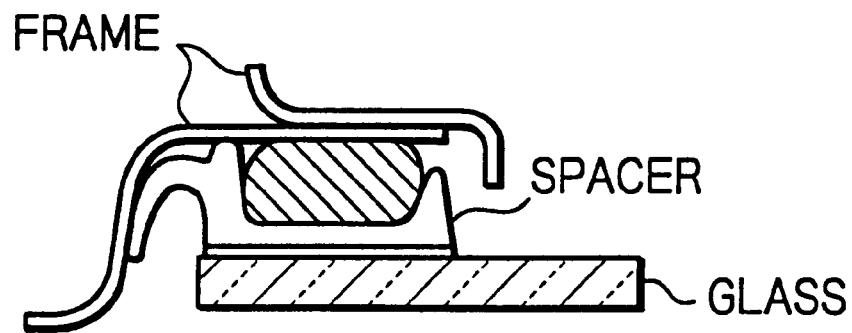

METHOD FOR THE PRODUCTION OF AN OPENING-CLOSING MEMBER AND A SUNROOF PRODUCED THEREFROM FOR USE WITH VEHICLE

BACKGROUND OF THE INVENTION

The entire disclosure of Japanese Patent Application No 10-124463 filed on May 7, 1998, including specification, claims, drawings and summary is incorporated by reference in its entirety.

The present invention relates to a method for the production of an opening-closing member and a sunroof for use with a vehicle by using the same. More particularly, the present invention relates to a simplified method for the production of an opening-closing member which can open or close a given opening portion with a high level of water tightness and precision by applied a foaming material on the opening-closing member and molding it into a given form. Moreover, it relates to a sunroof for use with a vehicle, which is produced by applying the simplified method.

Recently, a vehicle with a sunroof mounted on a rood panel of a vehicle body is becoming more popular. The sunroof may be of a type having a lid portion (a sunroof mold) disposed so as to close the opening portion disposed in the roof panel. The sunroof of this type can provide the driver and passengers with remarkable effects so that they feel relieved from a closed narrow space and are free, and so that air in the chamber can be exchanged. The sunroof mold is disposed so as to fix a frame onto a periphery of glass of the sunroof through a main seal. The resulting frame is then mounted on the opening portion thereof.

Hitherto, the sunroof mold is produced in a series of steps as shown in FIG. 12. First, a main seal of a preformed gasket is mounted on a plate of glass as shown in step (1) of FIG. 12. Then, a coupling string is inserted into the pre-formed gasket, and a frame to be mounted on the glass is treated with a highly viscous material for attachment to the frame, as shown in step (2) thereof. The frame is pressed under pressure with a fixing jig while removing the coupling string, as shown in step (3) thereof. The frame is then clamped with a clamp and placed for aging in an oven having a heated temperature as shown in step (4) thereof. Thereafter, the frame is removed from the oven and processed into a finished product by removing the clamp, as shown in step (5) thereof.

The conventional method for producing the sunroof mold as shown in FIG. 12, however, causes problems in that steps of assembly are too numerous because it requires clamping with the clamp and aging in the oven, and the like.

The conventional method further requires separately purchasing or producing a preformed gasket which causes an increase in costs of production. Further, this suffers from the problem that accuracy of the position in which the pre-formed gasket is mounted on the glass may be reduced.

In order to solve those problems prevailing in the conventional method, there is proposed a technique of shaping a glass mounting member in site without using the pre-formed sunroof mold. For instance, an article entitled "Advanced Concepts of Modular Glazings" of Saint Gobain company discloses the in site molding technique consisting of a three-step process as shown in FIG. 13. In the first step, a spacer in a U-shaped section made of a highly viscous material capable of being shaped under high pressure is disposed and attached along an edge section of a glass by using a hexa-axial robot or the like. In several hours after attachment, the sectionally U-shaped spacer is allowed to be fixed securely to the glass. Then, in the second step, adhesive beads made of the highly viscous material of the same kind are then applied along the bottom portion of the sectionally U-shaped spacer on a vehicle assembly line with a robot or the like. In the third step, a frame and other member is mounted on the glass by the applied adhesive. The adhesive can integrally mount the frame on the glass in association with the action of the spacer after it has been allowed to cure.

In the conventional molding technique for molding the sunroof mold as shown in FIG. 13, a step of mounting the pre-formed gasket and cleaning work to be carried out before the mounting step are not required because the frame is mounted on the glass with the adhesive made of the same material as the spacer. Therefore, a number of steps of assembly can be reduced as a whole, thereby making the manufacturing work more efficient. In addition, the adhesive applied may be transformed flexibly in site so that no disadvantages occur due to an error in the position of mounting the spacer.

The molding technique developed by Saint-Gobain company is characterized in that the adhesive beads are formed on the U-shaped spacer mounted on the edge section of the glass, and the adhesive beads are applied in combination with the frame by mounting the glass on the frame by the adhesive beads. The conventional technique, however, does not contain the aspect of applying the foaming material on the seal portion disposed at a portion close to the edge section of the glass.

If a highly viscous material of a usual kind is applied at a portion close to the edge section of the glass to achieve the seal portion, there may be caused an occasion where it is difficult to enhance the sealing property between the opening portion and the seal portion because the highly viscous material of a certain type may lack an appropriate degree of flexibility. Moreover, in cases where the highly viscous material is applied at the entire periphery of the glass edge section, it is less preferred because the weight of the sunroof mold becomes too heavy.

In addition, the conventional molding technique does not contain any concept of molding a material applied at the portion close to the glass edge section into a given form. This fact presents the problem that it is difficult to mold it into various forms so as to adapt it to versatile usage.

The conventional method for the production of the sunroof mold as shown in FIG. 12 enables the seal portion to be molded into a given form. This method, however, suffers from difficulties in that the seal portion cannot be molded integrally at the entire periphery of the glass edge section, in addition to a deviation of accuracy in the mounting position.

SUMMARY OF THE INVENTION

Therefore, the present invention has the object to provide a method for the production of an opening-closing member, which has been completed with the foregoing taken into account. The method of producing the opening-closing member according to the present invention can reduce a number assembly steps and costs, and does not cause any substantial deviation in accuracy of the position of mounting the seal portion. This method can further improve sealing performance between the seal portion and the opening portion.

The present invention has another object to provide a lightweight sunroof for use with a vehicle, which has highly improved sealing properties.

In order to achieve the objects, the present invention in an aspect provides a method for the production of an opening-closing member having a seal portion disposed at a portion close to an edge section of the opening-closing member corresponding to a given opening portion so as to close the given opening portion. A foaming material is applied at the portion close to an edge section of the opening-closing member, and the foaming material applied on the opening-closing member is molded into a given form.

The present invention further has an object to provide a method for the production of the opening-closing member. In this method, the seal portion is integrally molded over the entire periphery of the edge section of the opening-closing member. Moreover, the method of the present invention can achieve sealing of various kinds of opening portions by molding the seal portion into such a given form.

The method can improve the sealing properties of the opening-closing member for closing the opening-closing member, as compared with the case where the pre-formed gasket or the like is attached in site. This improvement is due to the fact that the foaming material which can hold an appropriate level of softness or flexibility even when it is cured, is applied at the portion close to the edge section of the opening-closing member as a seal portion.

The method of the present invention can offer an advantage in that a formed in-place foaming material can be molding easily so as to absorb a size error. For example, an error in the size of the opening-closing member or in the mounting position between individual members can be absorbed even if such a variety would occur. This is because the foaming material can be molded into a given form in a state that it is applied. The method further offers an advantage in that manufacturing labor can be reduced. Moreover, the method according to the present invention can offer an advantage in that the seal portion can be integrally molded easily over the entire periphery of the opening-closing member because the seal portion having a form which can be accurately adapted to a shape of the opening portion can always be formed. This method can furthermore improve sealing properties of the opening-closing member.

Other advantages of the method according to the present invention reside in that the seal portion which can flexibly achieve various shapes of opening portions can be molded with ease. In addition, the seal portion can be formed integrally over the entire periphery of the opening-closing member.

This method can further offer advantages in that no pre-formed seal portion is required to be purchased separately. As a consequence, costs of production can be reduced.

The method can be arranged so that the foaming material can be molded into a given form by using a given frame in the shaping step. This specific mode of the method can simplify the shaping step.

In this case, it is preferred that the foaming material comprises a thermosetting type, particularly, which can be allowed to cure at a relatively low temperature in the range of about 60° C. to 80° C. for a short period of time. It is further preferred that the shaping step contain a heating step for heating the given frame which is applied to the foaming material.

The heating step may be followed by the removal step for removing the given frame to yield a finished product.

In another aspect of the present invention. A method is provided for the production of the opening-closing member having the seal portion disposed at a portion close to the edge section of the opening-closing member corresponding to the given opening portion to close the given opening portion. The method comprises an applying step for applying the adhesive and the seal portion at the portion close to the edge section of the opening-closing member, and a shaping step for shaping the adhesive and the foaming material applied on the opening-closing member into a given form.

This mode of the invention joins the opening-closing member on other members by the adhesive because the adhesive is applied, in addition to the foaming material, and it is molded together with the foaming material.

The method in a second aspect of the invention may further comprise a mounting step for mounting a frame forming a portion of the opening-closing member on the opening-closing member by the adhesive applied thereon.

In the applying step of the method in the second aspect, the adhesive may be applied along at least a portion of the edge section of the opening-closing member, and the foaming material may be applied so as to cover an outer peripheral portion of the opening-closing member outside the portion at which the adhesive has been applied. This applying step allows the seal portion to be mounted securely on the opening-closing member by the adhesive. In the applying step, the adhesive and the foaming material may also be applied each by being discharged through a different discharge nozzle.

The molding step may be conducted by molding the foaming material and the adhesive into a given form by using a given frame. When the foaming material and the adhesive are molded with the identical frame, the procedures of the production of the opening-closing member can be simplified.

The molding step is further characterized in that the frame for molding a portion of the opening-closing member is pre-mounted on the given frame. Further, in the molding step, the foaming material and the adhesive are molded into a given form by using the given frame, and the frame is mounted on the opening-closing member by the adhesive.

This mode of the present invention can reduce the number of steps of assembly, and the period of time required for the production of the opening-closing member can be effected simultaneously with the mold of the foaming material and the adhesive.

In the embodiment of the present invention, the given frame may include one or more molds. When the given frame consists of two or more molds, it may preferably comprise a first mold and a second mold, which are complementary with each other. In this case, the adhesive and the foaming material are applied each on the opening-closing member disposed on the first mold in the applying step. The adhesive and the foaming material are then molded simultaneously into a given form by pressing the first mold to the second mold in the molding step. This configuration can simplify the molding step to a great extent.

In this embodiment, the frame for forming a portion of the opening-closing member may be mounted by mounting the frame on the second mold and mounting the frame on the opening-closing member by the adhesive when the first mold is lapped with the second mold. This arrangement of the molds can reduce a number of steps of assembly to a great extent.

In cases where the foaming material and the adhesive are each made of a thermosetting material in the modes of the embodiment where the given frame consists of the first and second molds, the molding step may further contain a heating pressure step for pressing the first mold and the second mold after the first mold has been lapped with the second mold, and then heating them in a pressed state. The heating pressure step can cure the foaming material and the adhesive while being shaped into an accurate form without causing the inserted molds to vary from the given shape.

After the heating pressure step, the frame removal step for removing the first and second molds is carried out to yield a finished product.

The opening-closing member produced by the process as described above may be used as any member that closes and opens a given opening. The opening-closing member may be a window, a door, or any other member as long as it can close and open the given opening portion. In particular, when it is used as an opening that requires a high level of sealing properties, it can achieve superior effects. There can be taken, as an example, a case where the opening comprises an opening for use with a window, and the opening-closing member comprises glass such as window glass, resinous glass, etc. A preferred mode of this embodiment may reside in, for example, a case where the opening involved comprises an opening disposed in a roof panel of a vehicle and the opening-closing member comprises a sunroof of the vehicle.

Further, another mode of the embodiment of the present invention is characterized in the case where the foaming material having the composition as described above comprises a mixture of the gas with the highly viscous material.

The another mode of the embodiment of the present invention is further characterized in the case where the foaming material having the composition as described above comprises the mixture of the gas with the highly viscous material, and the adhesive comprises a material of the same kind as the highly viscous material. The use of the same kind of foaming material for the adhesive can serve to simplify a system for carrying out the molding step of molding the foaming material.

The foaming material as the mixture of the gas with the highly viscous material as defined in the modes of the embodiment as described above can be prepared first by feeding the gas in a cylinder with a piston pump in the suction step of the piston pump where the piston is allowed to reciprocally move in the cylinder and by feeding the highly viscous material in the cylinder after the suction step, and then by discharging the mixture of the gas with the highly viscous material in the discharge step in which the gas and the highly viscous material are discharged after the highly viscous material has been fed. This mode of the embodiment of the present invention can mix the gas with the highly viscous material under a low pressure at an accurate rate of mixture. This can further use a more appropriate seal portion for the opening-closing member.

As an alternative process for mixing the gas with the highly viscous material, a further mode of the embodiment of the present invention is characterized in that the foaming material may be prepared by feeding the gas and the highly viscous material with plural disks rotating around a given axis. Then mixing the fed gas and highly viscous material are mixed with each other by rotating the plural disks and stirring the mixture. The mixture of the gas with the highly viscous material thereof is then discharged.

In a further mode of the embodiment of the present invention, the foaming material feed step for feeding the foaming material other than by mixing the gas with the highly viscous material is configured such that the foaming material may comprise a foaming material of a type foamed by application of heat, or a so-called two-liquid foaming material of a type foamed by mixing two different kinds of liquids.

In another embodiment of the present invention, there is provided a sunroof for use with a vehicle. The sunroof comprises a window glass therefor and a foaming material molded by foaming at the edge section of the window glass. The sunroof of this embodiment according to the present invention can improve the sealing property to a remarkable extent by molding the foaming material at the edge section of the window glass. The use of the foaming material for the sunroof can further realize making the sunroof light in weight. As a consequence, fuel economy of the vehicle is improved.

In a mode of the embodiment, the present invention is characterized in that the foaming material is molded so as to cover at least a portion of the outer peripheral portion of the window glass. It is possible as a matter of course to mold the foaming material so as to cover substantially the entire periphery of the window glass.

In another mode of the embodiment of the present invention, the highly viscous material may be allowed to cure in a gap between the foamed material and the edge section of the window glass.

In a further mode of the embodiment of the present invention, the frame of the sunroof is mounted on the portion where the highly viscous material is cured.

Other objects, features and advantages of the present invention will become apparent in the course of the description with reference to the accompanying drawings.

BRIEF DESCRIPTION OF THE DRAWINGS

FIG. 4(a) is a plan view of the window glass; FIG. 4(b) is a plan view of the first frame; and FIG. 4(c) is a sectional view of the first frame with the window glass disposed thereon, when taken along line A–A' of FIG. 4(b).

FIG. 10(a) shows the corner portion of the sunroof produced by a conventional method, and FIG. 10(b) shows the corner portion of the sunroof produced by the method according to the present invention.

FIG. 13 is a view showing a series of steps for mounting a sunroof mold in a conventional way.

DETAILED DESCRIPTION OF THE INVENTION

The present invention will be described in more detail by way of embodiments with reference to the accompanying drawings. A description of the embodiments according to the present invention will be made, as one example, by using the method for the production of the opening-closing member according to the present invention in a molding process by forming an in-place foamed mold-for producing a sunroof for use with an automobile vehicle.

Figure 1:
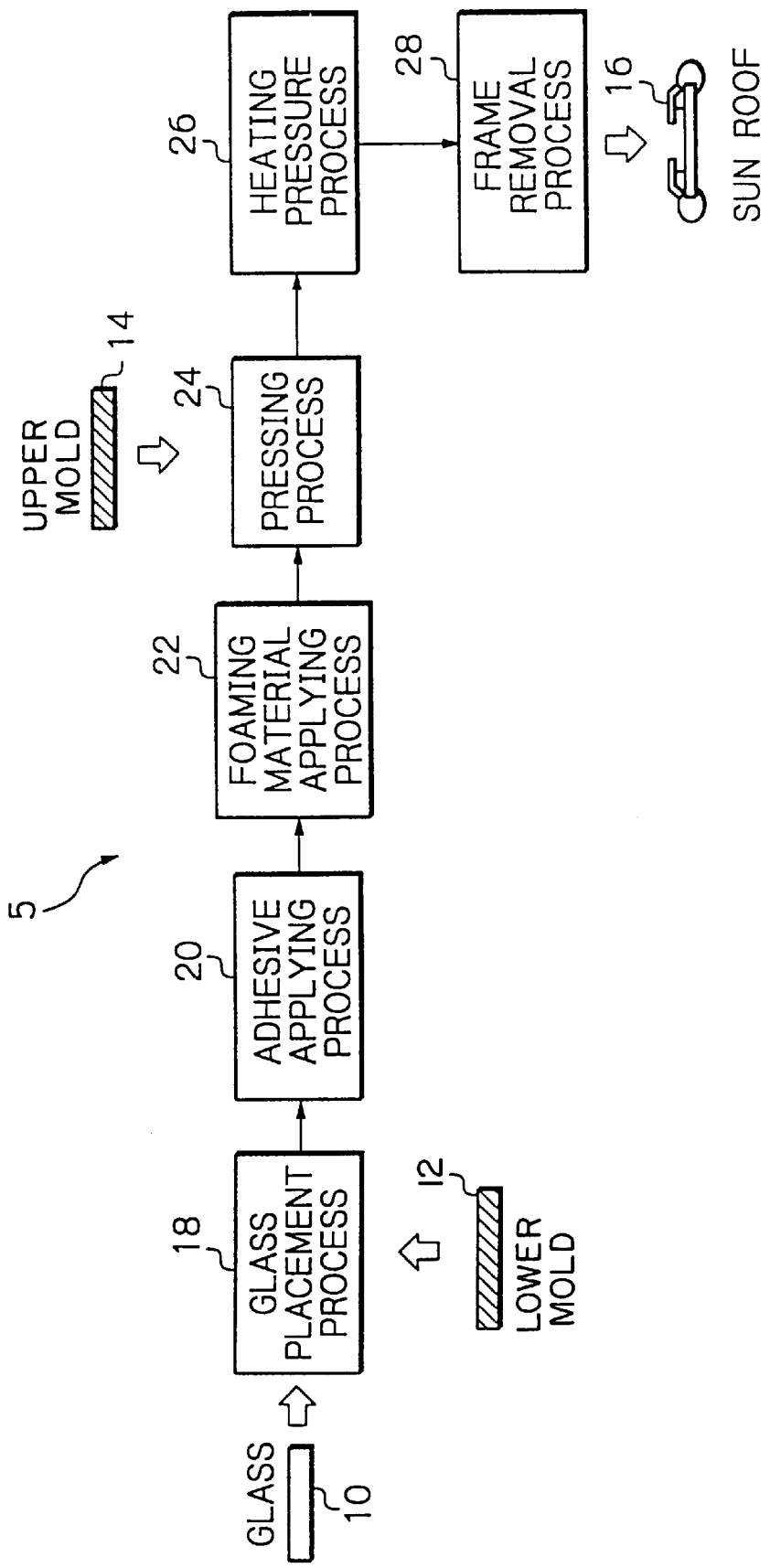
FIG. 1 is a block diagram showing an outline of the configuration of a foaming material applying system according to an embodiment of the present invention.

FIG. 1 is a block diagram showing a process for a foaming material applying system 5 according to one embodiment of the present invention. As shown in FIG. 1, the foaming material applying system 5 may comprise a glass placement process 18, an adhesive applying process 20, a foaming material applying process 22, a pressing or lapping process 24, a heating press process 26, and a frame removal process 28. The glass placement process 18 comprises placing glass 10 for use as a window glass for a sunroof in lower mold 12 and locating it in a predetermined position thereof. The adhesive applying process 20 comprises applying the glass 10 disposed on the lower mold frame 12 with adhesive. The foaming material applying process 22 comprises applying a foaming material on the glass 10 on which the adhesive has been applied. The pressing or lapping process 24 comprises pressing an upper mold 14 onto the glass 10 with the adhesive and the foaming material coated thereon and then joining it to the lower mold 12. The heating pressure process 26 comprises pressing the lower and upper molds and heating them in a pressed state. The frame removal process 28 comprises removing the jointed frames and taking out a sunroof 16 as a finished product.

Figure 11:
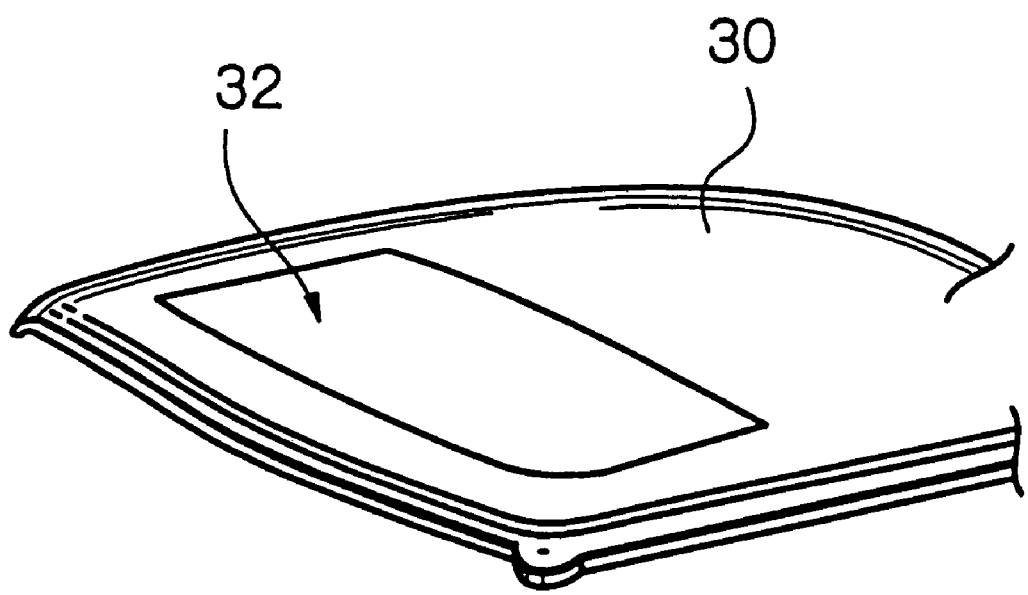
FIG. 11 is a perspective view showing a roof panel and an opening portion formed in the roof panel, on which the sunroof produced by the foaming material applying process according to the embodiment of the present invention is mounted.

The glass 10 may be shaped in a form, for example, such as a door (as an opening-closing member), so as to be adapted to an opening portion 32 of a roof panel 30 of the vehicle, as shown in FIG. 11. For example, for the opening portion 32, the glass 10 is shaped in a form as indicated in FIG. 4(a) which is a plan view showing the glass member. It is to be noted herein, however, that the glass member may preferably be shaped in a curved form so as to be adapted to a sunroof window, although it may be shaped in a flat form.

When a foaming material is applied over the entire periphery of the glass 10 as shown in FIG. 4(a), the lower mold 12 may be configured as a frame which has a molding groove 13 formed along the entire length of the periphery on the inside thereof along each side of its rectangular shape, as shown in FIG. 4(b) which is a plan view showing the lower mold. Where the glass 10 is disposed in the applying position of the lower mold 12 as indicated by the dotted line in FIG. 4(b), the outer periphery of the glass 10 is disposed so as to engage with the molding groove 13 to a slight extent. More specifically, an outer edge section of the glass 10 is disposed slightly outside the inner edge section of the molding groove 13. Further, a major portion of the width of the molding groove 13 is located outside the outer edge section of the glass 10. With this configuration, the molding groove 13 is arranged so as to cover an outer peripheral portion of the glass 10.

FIG. 4(c) shows a section of the lower mold 12 as taken along line A–A' of FIG. 4(b). As shown in FIG. 4(c), the sectional outline of the molding groove 13 is configured as a curved line that extends downwardly from the position of contact with the glass 10 below the bottommost plaice of the glass as it extends farther outside the glass and then extends upwardly again from the position close to the outermost peripheral portion of the lower mold 12.

The glass placement process 18 of FIG. 1 may consist of, for example, a robot, although not shown, which has its robot hand disposed so as to place the glass 10 on the lower mold 12 and position the glass on the mold in an accurate manner. For the glass placement process 18 having the above configuration, it is preferred to provide a sensor or the like for accurately sensing the positions of the lower mold 12 and the glass 10.

Figure 3:
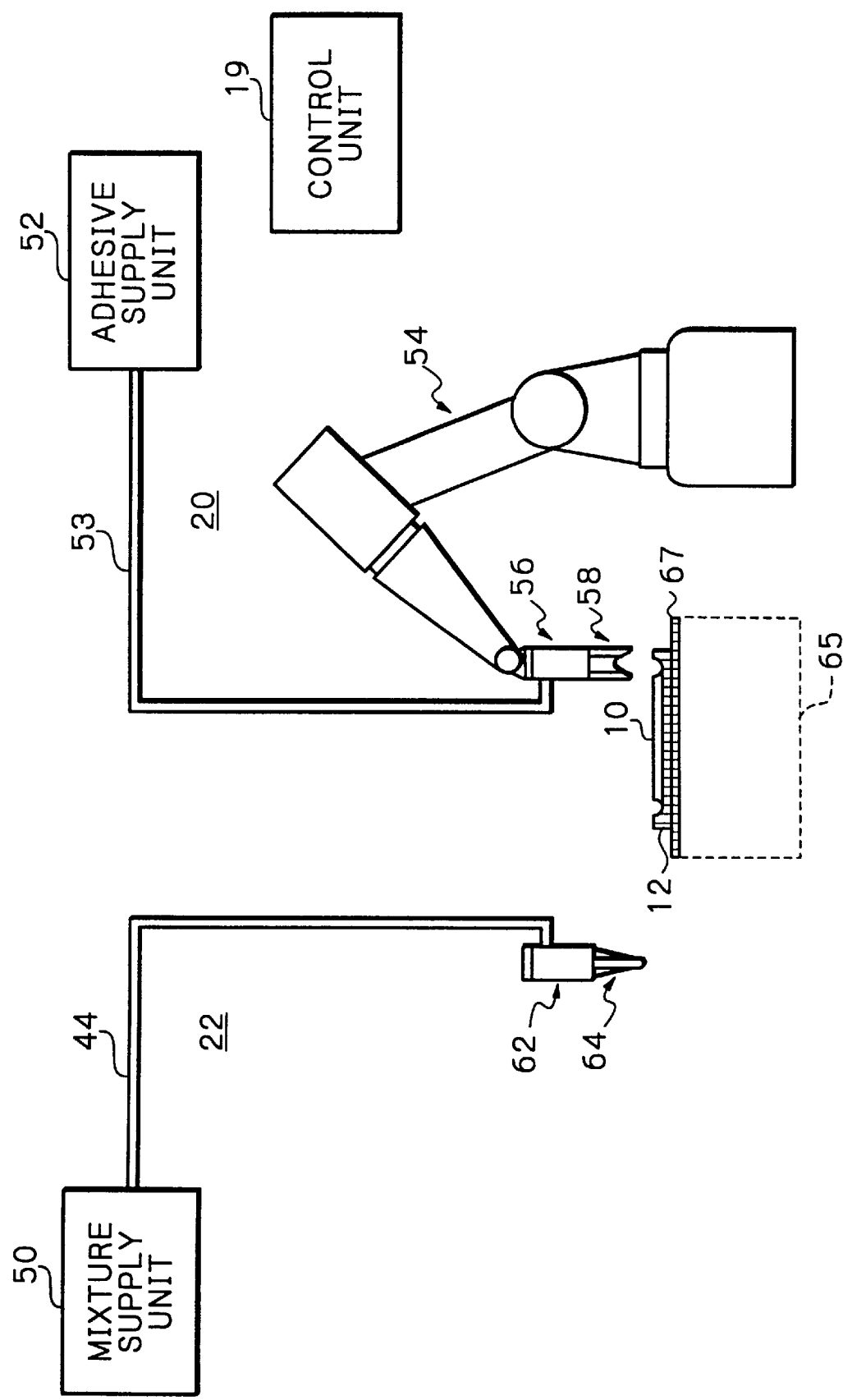
FIG. 3 is a schematic view showing an adhesive applying process and a highly viscous material applying process according to an embodiment of the present invention.

The adhesive applying process 20 and the foaming material coating process 22 may comprise systems having, for example, configurations as shown in FIG. 3. The systems are indicated in FIG. 3 such that the glass 10 mounted on the lower mold 12 is located in a given position in which it is being conveyed on a belt 67 of a belt conveyor 65. FIG. 3 further indicates the state in which the belt conveyor 65 is conveyed vertically, i.e. in the direction perpendicular to the paper plane of FIG. 3. The structuring elements are each managed and controlled by a control unit 19.

The adhesive applying process 20 may comprise an adhesive supply unit 52 for supplying adhesive through a tubular path 53, an adhesive discharge unit 56 connected to the tubular path 53, a nozzle 58 constituting atop edge section of the adhesive discharge unit 56, and a manipulator 54 for positioning the adhesive discharge unit 56 in the position specified by the control unit 19 in accordance with instructions from the control unit 19. The adhesive discharge unit 56 is mounted on the manipulator 54 with a mounting process, not shown, so as to be detachable therefrom, and controlled so as to discharge the adhesive in accordance with the operation of the manipulator 54.

The nozzle 58 of the adhesive applying process 20 is also provided with a slit extending in the direction of movement so as to enable applying a large amount of the adhesive while moving along the molding groove 13 of the lower mold 12.

Figure 9:
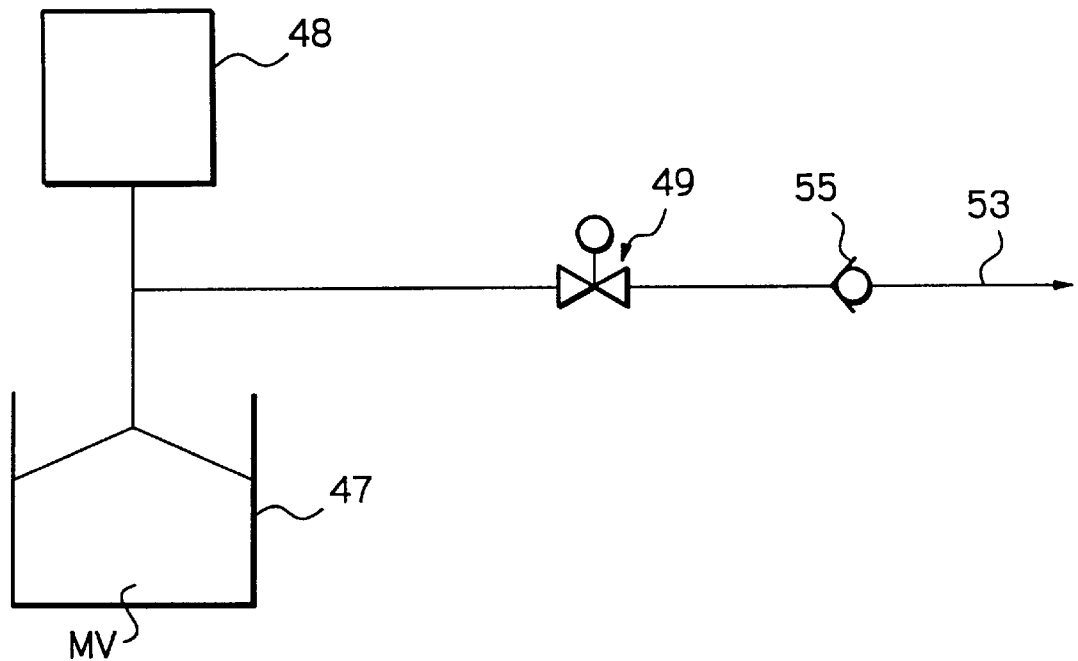
FIG. 9 is a view showing the configuration of the adhesive supplying unit 52 of FIG. 3.

As shown in FIG. 9, the adhesive supply unit 52 may comprise a pump 47 for discharging a predetermined amount of the adhesive stored in an adhesive container, a motor 48 for driving the pump 47, a valve 49 for opening or closing a flow of the adhesive discharged from the adhesive container, a check valve 55 for preventing a back flow of the adhesive, and a tubular path 53. The pump 47 may comprise, for example, a plunger of a follower plate type. The adhesive stored in the container is preferably a highly viscous material of a thermosetting type that can be allowed to cure at a temperature as relatively low as 60° C. to 80° C. for a short period of time.

The foaming material coating process 22 of FIG. 3 may comprise a mixture supply unit 50 for supplying the foaming material as a mixture of the gas with the highly viscous material through a tubular path 44, a foaming material discharge unit 62 connected to the tubular path 44 for discharging the foaming material, and a nozzle 64 constituting a top edge section of the foaming material discharge unit 62. The nozzle 64 is further configured so as to have an opening at its top edge other than the nozzle 58.

The foaming material discharge unit 62 is fixed in a predetermined position in usual cases and provided with a mounting adapter, not shown, which can be mounted on a manipulator 54. The manipulator 54 may be operated so as to shift the adhesive discharge unit 56 to the foaming material discharge unit 62 in the predetermined position after the applying of the adhesive with the adhesive discharge 56 has been finished. Thereafter, the applying of the mixture is effected with the foaming material discharge unit 62.

Alternatively, the manipulator 54 may be configured such that both the adhesive discharge unit 56 and the foaming material discharge unit 62 are mounted thereon and each of the units 56 and 62 can be operated in response to a signal from the control unit 19 to discharge either of the adhesive and the foaming material aid apply it on an objective article.

Figure 6:
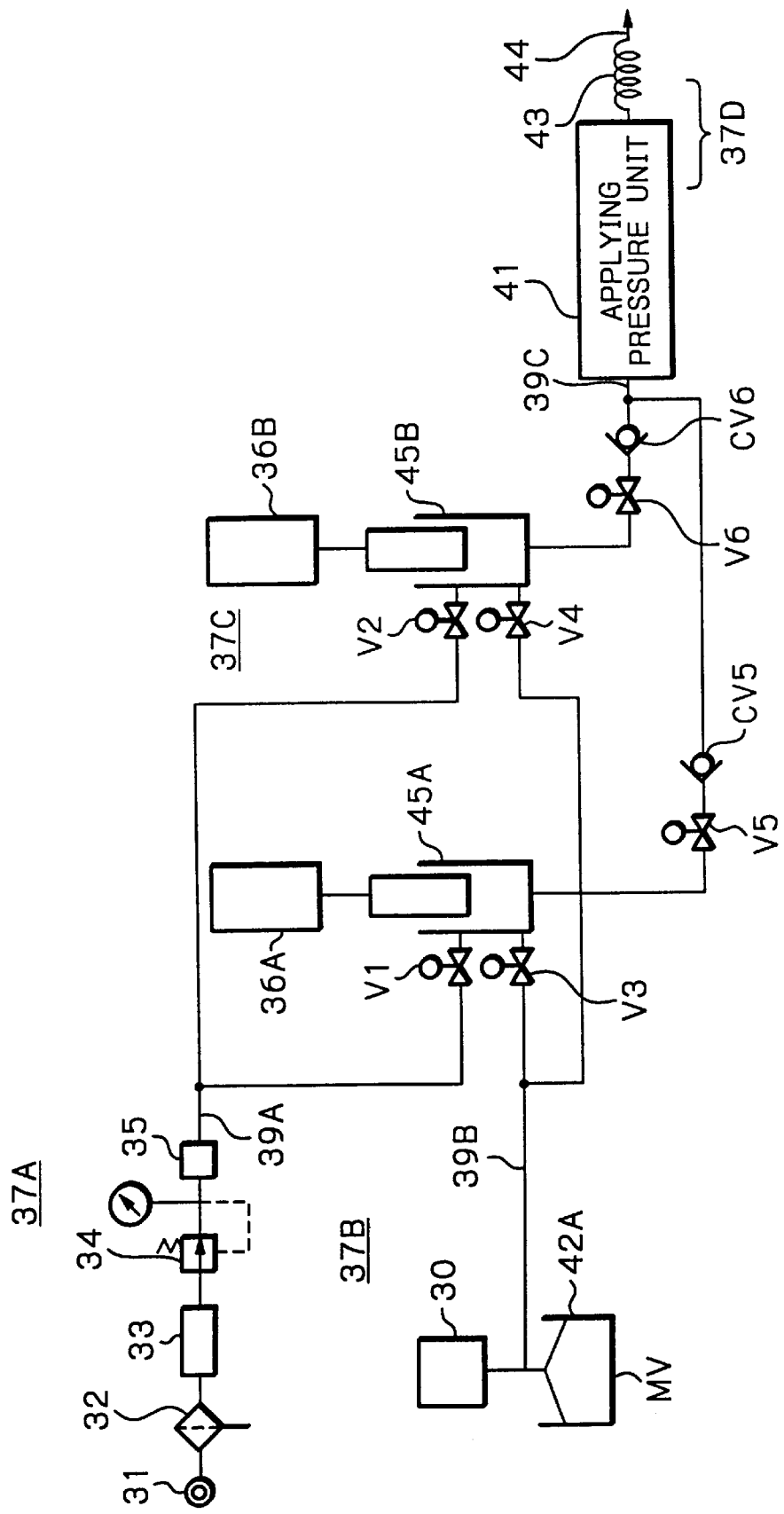
FIG. 6 is a circuit diagram showing the detailed configuration of the mixture supply unit 50 of FIG. 3.

The mixture supply unit 50 may be configured, for example, in a manner as shown in FIG. 6. More specifically, the mixture supply unit 50 may comprise a gas feed section 37A, a highly viscous material feed section 37B, a mixing section 37C, and a dispersing section 37D.

The gas supply section 37A may be configured such that the gas has a low pressure range which is adjusted under a predetermined pressure in the range, for example, from 0.1 to 5 $Kg/cm^2$, preferably from 0.1 to 3 $Kg/cm^2$. In the mode of the embodiment of the present invention, a known nitrogen gas generator may be used which is configured such that nitrogen gas can be separated and removed in a membrane type by supplying compressed air. As shown in FIG. 6, the gas supply section 37A may comprise a port 31 for receiving compressed air from a compressor, although not shown, a filter 32, a membrane separation module 33, a pressure adjustable valve 34, a gas flowmeter 35, and a tubular path 39A for supplying the separated nitrogen gas.

The highly viscous material supply section 37B may comprise a plunger pump 42A for discharging the highly viscous material stored in the container at a given flow rate, a motor 30 for driving the plunger pump 42A, and a tubular path 39B for channeling the highly viscous material discharged from the container. It is preferred that the highly viscous material stored in the container is a highly viscous material of a thermosetting type that can be allowed to cure at a relatively for temperature range of 60° C. to 80° C. for a short period of time. It is to be noted herein that the highly viscous material to be fed from the highly viscous material supply section 37B may be made of the same material as the highly viscous material that can also be used for the adhesive. In this case, the pump 47 of FIG. 9 may be used in place of the pump 42A of FIG. 6. Likewise, the motor 48 of FIG. 9 may be used in place of the motor 30 of FIG. 6.

The mixing section 37C may comprise a piston pump 45A and a piston pump 45B for use in the suction step and the discharge step, respectively, each of which is configured such that a piston can reciprocally move in the cylinder. To piston rods of the piston pumps 45A and 45B are connected a motor 36A and a motor 36B, respectively, which drive the pistons in a linear way.

The tubular path 39A of the gas supply section 37A is branched into two branch tubular paths. One branch tubular path thereof is then connected through a control valve V1 to a piston pump 45A at a position close to its top dead center. The other branch tubular path thereof is then connected through a control valve V2 to a piston pump 45B at a position close to its top dead center. On the other hand, the tubular path 39B of the highly viscous material supply section 37B is branched into two branch tubular paths. One branch tubular path thereof is then connected through a control valve V3 to the piston pump 45A at a position close to its bottom dead center. The other branch tubular path thereof is then connected, through a control valve V4 to the t piston pump 45B at a position close to its bottom dead center. It is to be noted herein that the piston pumps 45A and 45B are configured in such a manner that the highly viscous material supplied under pressure from the highly viscous material supply section 37B and the gas fed under pressure from the gas supply section 37A are each introduced in a batch system, respectively. The term "the bottom dead center" as referred to herein means a stroke end portion of the discharge step. The term "the top dead center" as referred to herein means a stroke end portion of the suction step.

The piston pump 45A is connected to a discharge tubular path for discharging the mixture of the gas with the highly viscous material, which is mixed in the cylinder, extending from the stroke end portion of the discharge step. The discharge tubular path is provided with a discharge control valve V5 and a check valve CV5. Likewise, the piston pump 45B is connected to a discharge tubular path for discharging the mixture of the gas with the highly viscous material, which is mixed in the cylinder, extending from the stroke end portion of the discharge step. The discharge tubular path is provided with a discharge control valve V6 and a check valve CV6. The discharge tubular paths are then combined into a one tubular path 39C.

Figure 7:
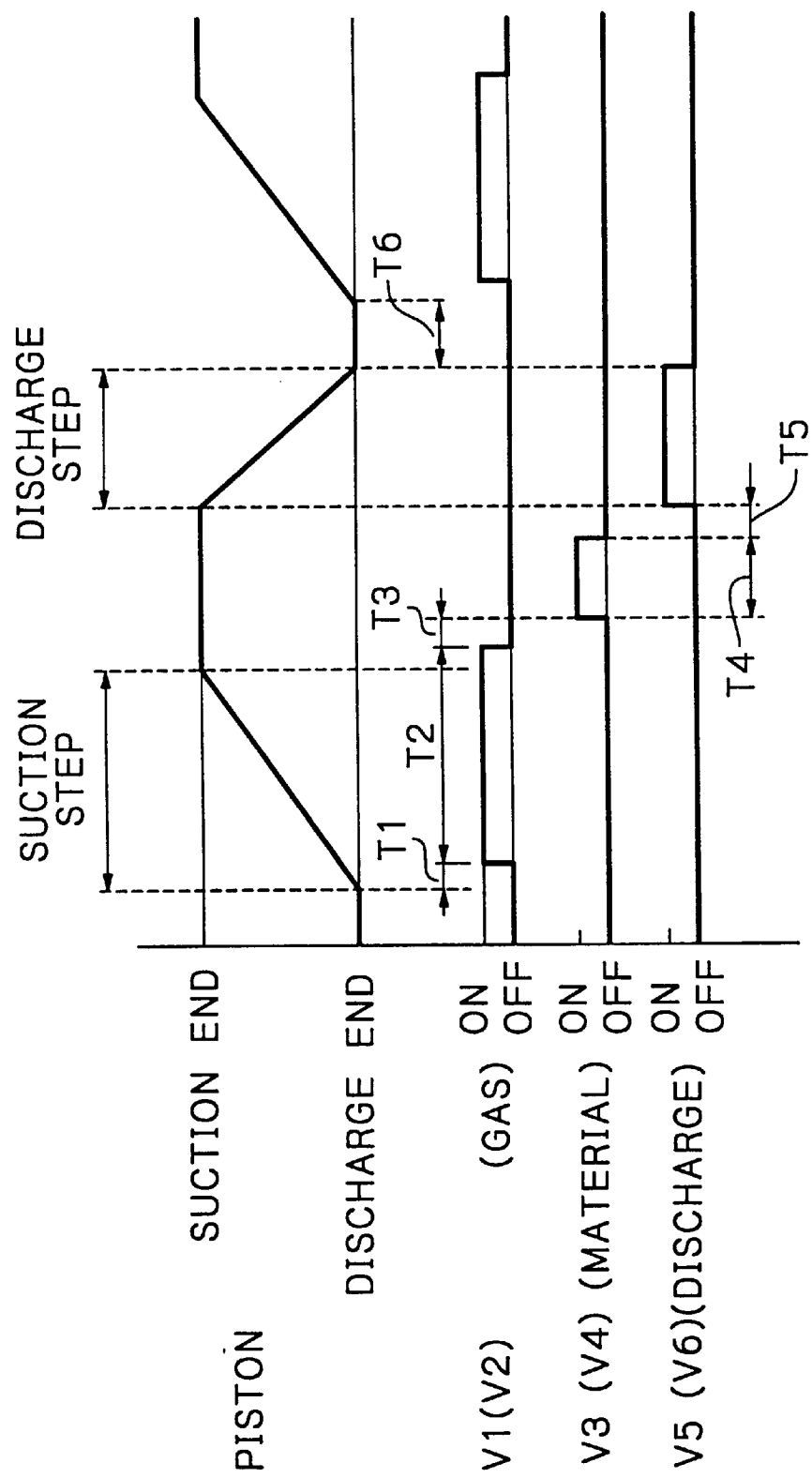
FIG. 7 is a timing chart showing the action timing of the suction step and the discharge step of the cylinder pump as shown in FIG. 6.

The piston pumps 45A and 45B of the mixing section 37C and their valve systems are configured such that their actions are controlled in accordance with the timing chart as shown in FIG. 7. The piston pumps 45A and 45B are operated so as to effect the discharge steps alternately and not to effect them simultaneously. This configuration of the piston pumps and their valve systems can feed the gas in the cylinders in the suction step, and feed the highly viscous material under a higher pressure than the pressure of gas when the piston is located at the stroke end portion of the suction step, while the mixture of the gas with the highly viscous material is discharged in the discharge step. The highly viscous material and the gas can be mixed with each other in volumes equal to the respective cylinder volume, because the volume of-the gas is compressed up to a negligibly minute compression by the highly viscous material fed therein later. This enables the pressure of the gas to be fed into the cylinder to be reduced, and controls a rate of mixture of the gas with the highly viscous material easily by adjusting the pressure of feeding the gas.

The tubular path 39C is connected to the dispersing section 37D which comprises an applying pressure unit 41 and a dispersing tubular path 43. The dispersing section 37D is then connected to a discharge tubular path 44. The pressure of the mixture increased by the applying pressure unit 41 has its gas bubbles broken into fine bubbles during the passage of the dispersing tubular path 43, which in turn are allowed to be dispersed into the highly viscous material.

The pressing process 24 of FIG. 1 can be carried out by a robot hand or the like which can position the upper mold 14 on the lower mold 12 with the glass 10 disposed thereon and adapt the former to the latter. In this case, it is preferred that a sensor or the like be provided for accurately sensing the positions of the lower mold 12 and the upper mold 14.

Figure 5B:
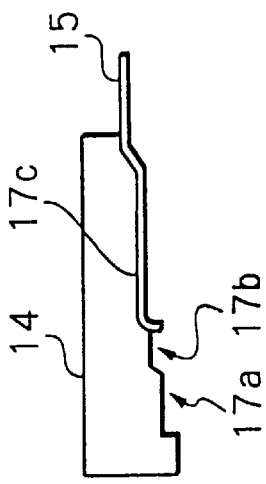
FIG. 5(b) is a sectional view of the second frame when taken along line B–B' of FIG. 5(a)
Figure 5C:
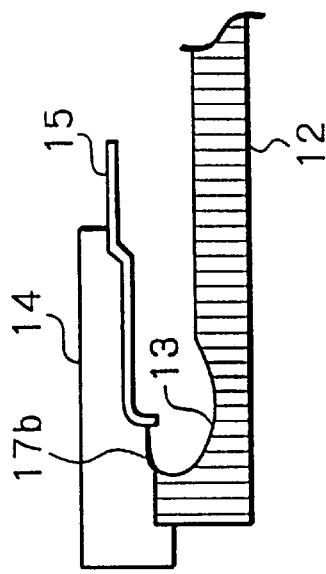
FIG. 5(c) is a partially sectional side view of the second frame lapped with the first frame.
Figure 5A:
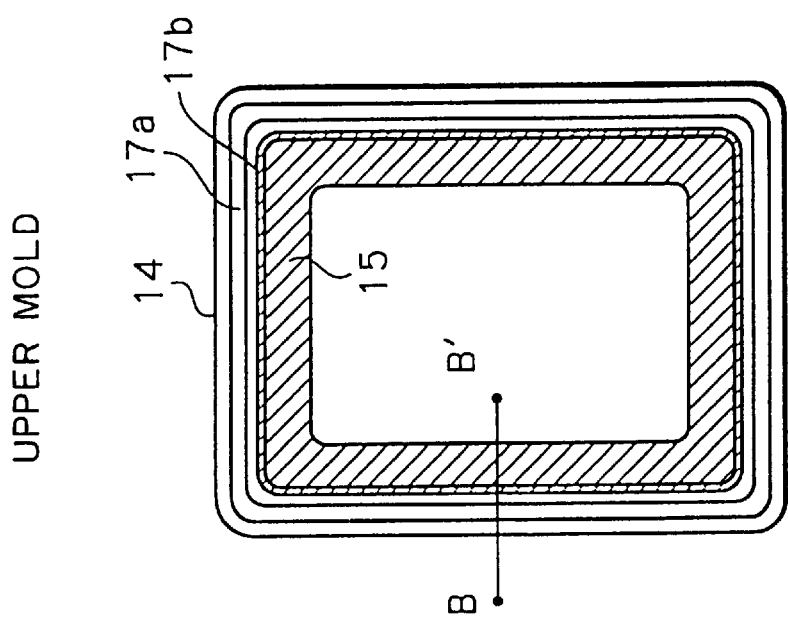
FIG. 5(a) is a plan view of the second frame.

The upper mold 14 can produce a sunroof integrally with the lower mold 12. For instance, the upper mold 14 may be shaped in a form, for example, as shown in FIG. 5(*a*), so as to be adapted to the lower mold 12 of FIG. 4(*b*). As shown in FIG. 5(*a*), the upper mold 14 may comprise a first groove 17*a* disposed so as to adapt to an edge section of the lower mold 12, and a second groove 17*b* for forming the sunroof mold integrally with the molding groove 13 of the lower mold 12. On the inside of upper mold 14 is further mounted a frame 15 made from a metal. The frame 15 can work as a support member for mounting a finished sunroof 16 on the opening portion 32 of FIG. 1 through a hinge. When the upper mold 14 is taken along line B–B' as shown in FIG. 5(b), it is found that a groove 17c is disposed further inside the groove 17b, and the frame 15 is mounted over the groove 17c. FIG. 5(c) shows the state in which the upper mold 14 is lapped with the lower mold 12.

The heating pressure process 26 may comprise a heating means for heating the opening-closing member at a predetermined temperature and a fixing jig for pressing the lower and upper frames which are heated or in the heating oven. The frame removal process 28 is to detach the lower and upper molds after loosening the fixing jig and to remove the glass 10 only as a finished product. This mold removal process 28 can be carried out by a robot hand or other suitable means.

Figure 2:
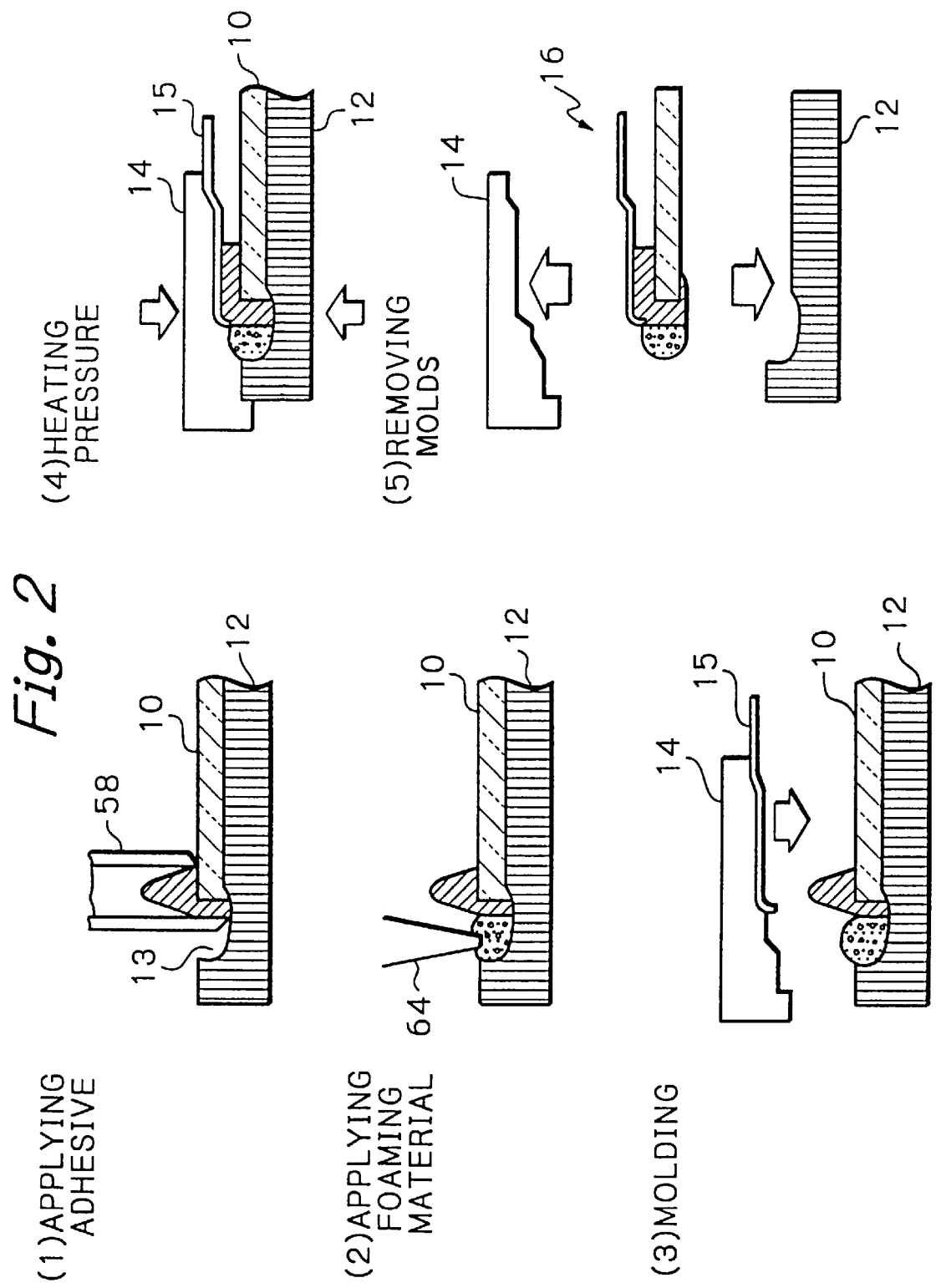
FIG. 2 is a schematic view showing the sections of the elements corresponding to a series of the steps of the process according to an embodiment of the present invention.

Then, a description will be made of the process for manufacturing a sunroof by the foaming material applying system according to the embodiment of the present invention with reference to FIG. 2. In the embodiment of FIG. 2, as an example, there is taken a case where the highly viscous material of a type thermosetting upon heating is used for both of the foaming material and the adhesive.

In the adhesive applying step as shown in FIG. 2(1), the nozzle 58 of the discharge unit 56 is disposed at a position close to the glass edge section by the manipulator 54 of FIG. 3, the glass 10 being disposed in a predetermined position of the lower mold 12 in the glass placement process 18. The adhesive is then supplied from the adhesive supply unit 52 and discharged from the nozzle 58 by supplying the adhesive from the adhesive supply unit 52. The manipulator 54 transfers the discharge unit 56 so as to allow the top end of the nozzle to cover the entire periphery of the glass edge section in such a state that the discharge unit 56 has discharged the adhesive from the nozzle 58. The edge section of the glass 10 and the inner portion of the molding groove 13 are applied with the adhesive discharged to a given depth or thickness over the entire periphery thereof In the foaming material applying step as shown in FIG. 2(2), the foaming material is further applied in the molding groove 13 outside the adhesive applied over the entire periphery thereof. In this step, the discharge unit 62 is mounted on the manipulator 54. In the configuration as shown in FIG. 2, the manipulator 54 has the discharge unit 62 disposed so as to be located near to the outside of the adhesive applied in the top end position of the nozzle 64, and the mixture supply unit 50 supplies the mixture of the gas with the highly viscous material through the tubular path 44 to the discharge unit 62. When the foaming material has been discharged from the nozzle 64, the manipulator 54 transfers the discharge unit 62 along the periphery of the glass 10. The speed of transferring the discharge unit 62 and the rate of discharging the foaming material are adjusted so as to apply the foaming material on the outer portion of the molding groove 13 so as to arise to a given height or depth.

Then, in the molding step as shown in FIG. 2(3), the upper mold 14 is lapped in the pressing process 24 on the lower mold 12 on which the adhesive and the foaming material are applied. In the pressing process, the foaming material and the adhesive applied are molded into a given form predetermined by the lower and upper molds. When the highly viscous material and the adhesive, which constitute the foaming material, are each of a curing type at ambient temperature, not of a curing type, such as a thermosetting type at a heating temperature, the procedures up to the molding step have to be carried out as quickly as possible before the highly viscous material is allowed to cure.

In the heating pressure step as shown in FIG. 2(4), the foaming material and the adhesive are pressed by lapping the lower mold with the upper mold and then heated in the heating pressure process 26 in a state in which the molded foaming material and adhesive are pressed. When the foaming material and the adhesive, each of a thermosetting type, are used, they are allowed to cure while maintaining their molded form. On the other hand, when they are each of a curing type at ambient temperature, no heating process is required. If it takes a length of time to allow the foaming material and the adhesive to cure, however, it is required to press the lower mold 12 and the upper mold 14.

In the frame removal step as shown in FIG. 2(5), the lower mold 12 and the upper mold 14 are removed by the frame removal process 28, and only the finished sunroof 16 is taken out.

The sunroof produced by the processes as shown in FIG. 2 has a foamed material portion 70 tightly attached to an opening portion 32 (as shown in FIG. 11) disposed so as to cover an outer peripheral portion of the glass, as shown in FIG. 10(b). Between the foamed material portion 70 and the glass 10 is formed an in-place mold 72 which is also used as adhesive. On the formed in-place mold 72 is further mounted a frame 15 bonding as a mounting support member for mounting the sunroof 16 on the opening portion 32.

The sunroof 16 according to the present invention can offer the following advantages as compared with a sunroof 74 of FIG. 10(a) produced by conventional processes.

The provision of the foamed material portion 70 can improve the sealing property between the foamed material portion 70 and the opening portion 32 because it can provide a more appropriate degree of softness than a pre-formed EDPM.

The mounting of the formed in-place mold 72 on the glass 10 allows an easy production of a mold having an accurate size and configuration in accordance with, for example, the dimensions and position of the glass 10, because the highly viscous material can be applied directly on the glass 10. Further, the constant-size form of the formed inplace mold can be assured by the lower and upper molds. Therefore, the labor for production otherwise needed to form a conventional article can be reduced to a great extent without encountering the problems inherent in conventional processes, which may be caused to occur due to, for example, an insetting error of the mounting position, which may occur upon mounting a pre-formed EPDM on the glass.

The method for the production according to the present invention, which uses the highly viscous material, can produce the opening-closing member in an easier manner than the conventional method for the production of the opening-closing member which uses the conventional preformed mold. Further, this method can reduce costs of production as compared with the conventional method.

Figure 12:
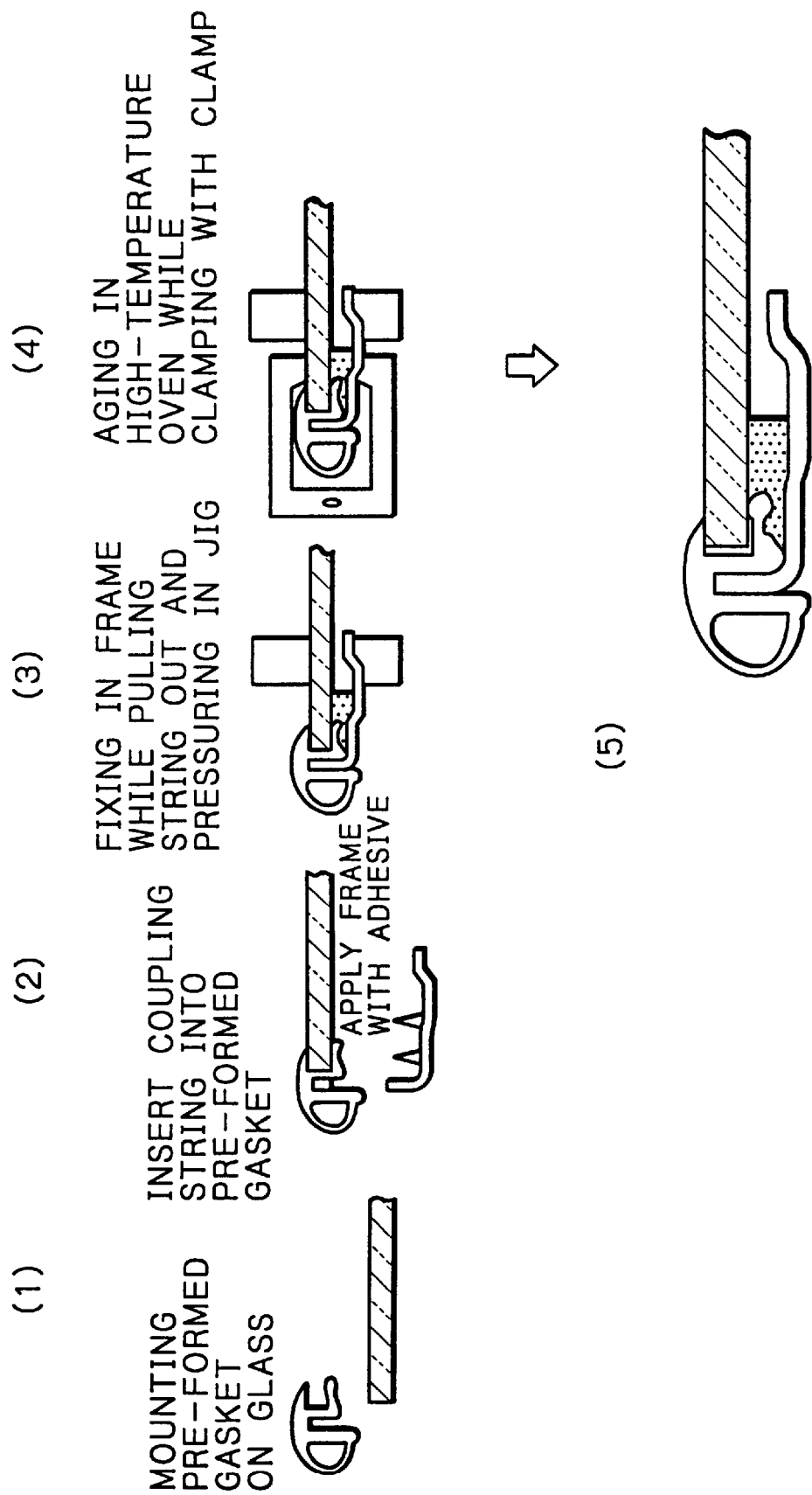
FIG. 12 is a view showing a series of steps for manufacturing a sunroof mold according to the conventional method.

Further, the method according to the present invention can reduce the number of process steps for the production of the opening-closing member as compared to the conventional method as shown in FIG. 12. Moreover, the sunroof can be produced readily and quickly because the frame is mounted on the upper mold, and the highly viscous material can be molded simultaneously with the mounting of the upper mold jointing the lower mold.

Although the present invention is described by way of the embodiments, it is to be noted that the present invention is not construed as being limited in any respect to the embodiments as described above, and it is understood that the present invention encompasses any variations and modifications without departing from the scope and spirit of the invention.

Further, it is to be noted that, for example, the production processes as shown in FIG. 2 may be applied to opening-closing members adapted so as to cover general opening portions, as well as sunroofs. Such opening-closing members may include window glasses, resinous glass plates, plastic plates, and metallic doors, as well as sunroofs. Moreover, when the method according to the present invention is applied to the production of opening-closing members which require no frame, there may be used those which have no frame mounted on the upper mold, in the process as shown in FIG. 2. When there is used an opening-closing member which has its outer peripheral portion applied with the foaming material only, the adhesive applying step can be omitted from the process of FIG. 2.

Although the above example indicates the case where the foaming material is applied over the entire periphery of the glass as the opening-closing member, it should be noted as a matter of course that the present invention is not limited to those modes of the embodiments in any respect and that the present invention can encompass any modifications and variations without departing from the scope and spirit of the invention. For instance, the present invention encompasses within its scope the case in which, where the opening-closing member is attached only to a portion of the periphery of the opening portion, the foaming material is applied only at a partial portion thereof where the opening-closing member is tightly attached to the opening portion. The same thing can be said of the adhesive. In summary, the present invention allows the adhesive and the foaming material to be applied in any appropriate position in accordance with the actual situation of the opening-closing member.

It is further noted herein that the present invention is not limited in any respect to the shape of the adhesive and the foaming material, say the shape of the frame, and that the present invention can be varied in an appropriate manner with the shape of the opening-closing member or the opening portion.

Although two molds, i.e., lower and upper molds, are used in the embodiments as described above, the present invention is not limited to such two molds in any respect, and it can encompass embodiments where three or more molds are used for molding.

Moreover, it is noted herein that, although the mixture of the gas with the highly viscous material is used as the foaming material in the embodiments as described above, the present invention is not limited to such mixture in any respect. It encompasses cases where there is used, for example, a highly viscous material of a foaming type by application of heat or a foaming material of a two-liquid type.

Figure 8:
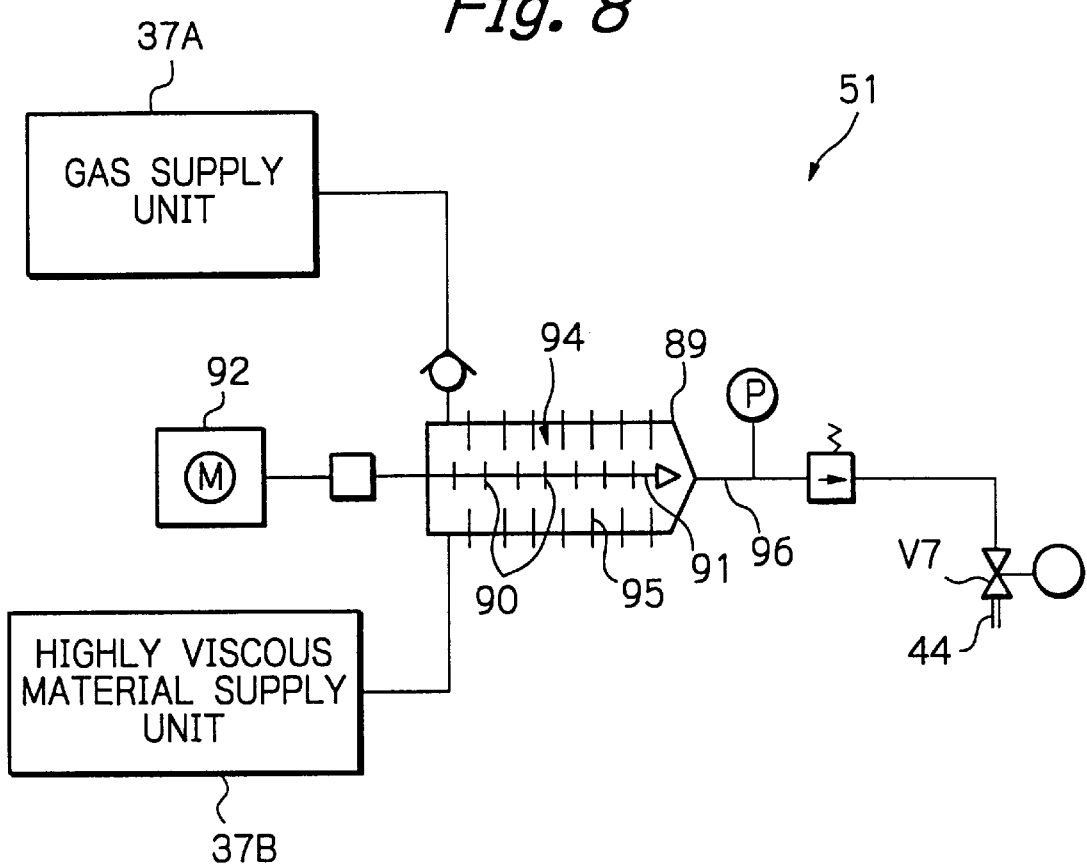
FIG. 8 is a view showing the detailed configuration of another example of the mixture supply unit 50 of FIG. 3.

In the embodiments as described above, the method according to the present invention uses the mixture supply unit 50 having the cylinder pump as the mixing system for mixing the gas with the highly viscous material. It should be noted, however, that the present invention is not limited to a particular one such as the mixing system, and that a mixture supply unit 51 as shown in FIG. 8 can also be used. As shown in FIG. 8, the same structuring elements are provided with the same reference numerals as those of FIG. 6.

The mixture supply unit 51 of FIG. 8 is provided with a mixer 94 to which the gas and the highly viscous material are supplied. The mixer 94 may comprise a rotary shaft 91 extending through a housing 89 over its entire length, a plurality of disks 90 mounted on the rotary shaft in a spaced relationship, a projection portion 95 projecting from the inner wall of the housing 89 so as to interpose each of the disks 90 therebetween, and a discharging tubular path 96 for discharging the mixture. The rotary shaft 91 is connected to a motor 92 for driving and rotating the rotary shaft. The discharging tubular path 96 is connected to a tubular path 44 through a control valve V7. The rotation of the rotary shaft 91 breaks gas bubbles flowing along each of the disk surfaces into fine bubbles which in turn are allowed to be dispersed into the highly viscous material.

Effects of the Invention

As described above, the present invention can offer advantages in that, because the foaming material having an appropriate level of softness (even upon being allowed to cure) is applied at the portion close to the edge section of the opening-closing member as-a seal portion, the present invention can improve the sealing performance of the opening-closing member for closing the opening portion to a greater extent than the case where the preformed mold and other parts are attached in a plant or in site.

As the present invention is configured such that the foaming material is molded into a given form in the applied state, the present invention can offer advantages in that, even if there would be an error among individual members in the size or mounting positions of the opening-closing members, the formed in-place foaming material can be shaped easily so as to absorb such a size error and so that the seal portion can be formed so as to accurately adapt to the form of the opening portion. The present invention can further offer an advantage in that costs of production can be reduced because it is not necessary to purchase the preformed mold.

Moreover, the present invention has an effect of readily molding in the seal portion which can be flexibly adapted to the opening portion of versatile forms because the foaming material can be molded in a given form after it has been applied at the portion close to the edge section of the opening portion. In addition, the seal portion can be formed integrally over the entire periphery of the opening portion so that the opening-closing member can ensure the tight sealing properties with the opening portion.

The present invention in another aspect provides the sunroof for use with the vehicle by molding the foaming material at the edge section of the window glass therefor, and secures the effect of improving sealing properties between the opening-closing member and the opening portion. The present invention further offers advantages in that the opening-closing member can be made light in weight by using the foaming material and serves to improve fuel economy.

What is claimed is:

1. A method of producing an opening-closing member having a sealing portion, said method comprising:

positioning the opening-closing member in a lower mold;

applying a foaming material at a peripheral edge of the opening-closing member positioned in the lower mold;

positioning an upper mold over the lower mold after said applying of the foaming material at the peripheral edge of the opening-closing member positioned in the lower mold; and pressing the upper mold against the lower mold after said positioning of the upper mold so as to mold the foaming material applied at the peripheral edge of the opening-closing member into a predetermined form.

2. The method of claim 1, wherein said applying of a foaming material comprises applying a thermosetting material, and further comprising heating the lower mold and the upper mold during said pressing of the upper mold against the lower mold.

3. The method of claim 2, further comprising removing the upper mold and the lower mold after said pressing of the upper mold against the lower mold and after said heating of the lower mold and the upper mold.

4. The method of claim 1, wherein said positioning of the opening-closing member comprises positioning a glass window.

5. The method of claim 1, wherein said positioning of the opening-closing member comprises positioning a vehicle sunroof.

6. The method of claim 1, further comprising mixing a highly viscous material and a gas to form the foaming material prior to said applying of the foaming material at the peripheral edge of the opening-closing member.

7. The method of claim 6, wherein said mixing comprises:
feeding the gas into a cylinder with a piston pump, the piston pump having a piston arranged to reciprocate within the piston pump;
feeding the highly viscous material into the cylinder after said feeding of the gas into the cylinder so as to form a mixture; and
discharging the mixture from the piston pump.

8. The method of claim 6, wherein said mixing comprises:
feeding the gas and the highly viscous material into a mixer having a plurality of disks arranged so as to rotate around an axis of the mixer;
rotating the disks of the mixer so as to stir the gas and the highly viscous material to form a mixture; and
discharging the mixture from the mixer.

9. The method of claim 1, further comprising forming the foaming material by heating a foaming-type highly viscous material prior to said applying of the foaming material at a peripheral edge of the opening-closing member.

10. The method of claim 1, further comprising forming the foaming material by mixing two types of liquids prior to said applying of the foaming material at a peripheral edge of the opening-closing member.

11. The method of claim 1, wherein said applying of the foaming material at the peripheral edge of the opening-closing member comprises applying foaming material around an entire peripheral edge of the opening-closing member.

12. The method of claim 1, further comprising:
applying an adhesive material at the peripheral edge of the opening-closing member positioned in the lower mold, and
wherein said positioning of the upper mold over the lower mold comprises positioning the upper mold over the lower mold after said applying of the foaming material and said applying of the adhesive material at the peripheral edge of the opening-closing member positioned in the lower mold; and
wherein said pressing of the upper mold against the lower mold comprises pressing the upper mold against the lower mold after said positioning of the upper mold so as to mold the foaming material and the adhesive material applied at the peripheral edge of the opening-closing member into a predetermined form.

13. The method of claim 12, further comprising:
positioning a frame in the upper mold prior to said positioning of the upper mold over the lower mold; and
joining the frame to the opening-closing member by pressing the frame against the adhesive material applied at the peripheral edge of the opening-closing member during said pressing of the upper mold against the lower mold.

14. The method of claim 13, wherein said applying of the adhesive material at the peripheral edge of the opening-closing member comprises applying the adhesive material along at least a portion of the peripheral edge, and wherein said applying of the foaming material at the peripheral edge of the opening-closing member comprises applying the foaming material after said applying of the adhesive material so as to cover at least a portion of the adhesive material applied along at least a portion of the peripheral edge.

15. The method of claim 12, wherein said applying of the adhesive material at the peripheral edge of the opening-closing member comprises applying the adhesive material along at least a portion of the peripheral edge, and wherein said applying of the foaming material at the peripheral edge of the opening-closing member comprises applying the foaming material after said applying of the adhesive material so as to cover at least a portion of the adhesive material applied along at least a portion of the peripheral edge.

16. The method of claim 12, wherein said applying of the foaming material at the peripheral edge of the opening-closing member comprises discharging the foaming material from a first nozzle to a predetermined position, and wherein said applying of the adhesive material at the peripheral edge of the opening-closing member comprises discharging the adhesive material from a second nozzle to a predetermined position, the first nozzle being a separate nozzle from the second nozzle.

17. The method of claim 12, further comprising:
positioning a frame in one of the upper mold prior to said positioning of the upper mold over the lower mold and the lower mold prior to said positioning of the opening-closing member in the lower mold; and
joining the frame to the opening-closing member by pressing the frame against the adhesive material applied at the peripheral edge of the opening-closing member during said pressing of the upper mold against the lower mold.

18. The method of claim 12, wherein the upper mold is complementary to the lower mold, said positioning of the upper mold over the lower mold comprising lapping the upper mold over the lower mold.

19. The method of claim 18, wherein said applying of the foaming material comprises applying a thermosetting foaming material, and said applying of the adhesive material comprises applying a thermosetting adhesive material, and further comprising heating the lower mold and the upper mold during said pressing of the upper mold against the lower mold.

20. The method of claim 19, further comprising removing the upper mold and the lower mold after said pressing of the upper mold against the lower mold and after said heating of the lower mold and the upper mold.

21. The method of claim 18, further comprising:
positioning a frame in the upper mold prior to said lapping of the upper mold over the lower mold; and
joining the frame to the opening-closing member by pressing the frame against the adhesive material applied at the peripheral edge of the opening-closing member during said pressing of the upper mold against the lower mold.

22. The method of claim 21, wherein said applying of the foaming material comprises applying a thermosetting foaming material, and said applying of the adhesive material comprises applying a thermosetting adhesive material, and further comprising heating the lower mold and the upper mold during said pressing of the upper mold against the lower mold.

23. The method of claim 12, further comprising mixing a highly viscous material and a gas to form the foaming material prior to said applying of the foaming material at the peripheral edge of the opening-closing member, wherein said applying of the adhesive material at the peripheral edge of the opening-closing member comprises applying the same kind of highly viscous material.

24. The method of claim 23, wherein said mixing comprises:

feeding the gas into a cylinder with a piston pump, the piston pump having a piston arranged to reciprocate within the piston pump;

feeding the highly viscous material into the cylinder after said feeding of the gas into the cylinder so as to form a mixture; and discharging the mixture from the piston pump.

25. The method of claim 23, wherein said mixing comprises:

feeding the gas and the highly viscous material into a mixer having a plurality of disks arranged so as to rotate around an axis of the mixer;

rotating the disks of the mixer so as to stir the gas and the highly viscous material to form a mixture; and discharging the mixture from the mixer.

26. The method of claim 12, wherein said positioning of the opening-closing member comprises positioning a glass window.

27. The method of claim 12, wherein said positioning of the opening-closing member comprises positioning a vehicle sunroof.

28. The method of claim 12, further comprising mixing a highly viscous material and a gas to form the foaming material prior to said applying of the foaming material at the peripheral edge of the opening-closing member.

29. The method of claim 12, further comprising forming the foaming material by heating a foaming-type highly viscous material prior to said applying of the foaming material at a peripheral edge of the opening-closing member.

30. The method of claim 12, further comprising forming the foaming material by mixing two types of liquids prior to said applying of the foaming material at a peripheral edge of the opening-closing member.

* * * * *